United States Patent [19]
Wang

[11] Patent Number: 5,440,714
[45] Date of Patent: Aug. 8, 1995

[54] METHOD AND SYSTEM CONFIGURATION FOR SIMPLIFYING THE DECODING SYSTEM FOR ACCESS TO AN REGISTER FILE WITH OVERLAPPING WINDOWS

[75] Inventor: Song-Tine Wang, Hsin Chu, Taiwan

[73] Assignee: Industrial Technology Research Institute, Hsing Chu, Taiwan

[21] Appl. No.: 990,641

[22] Filed: Dec. 14, 1992

[51] Int. Cl.$^6$ ............................................... G06F 9/34
[52] U.S. Cl. ..................... 395/492; 364/247; 364/933; 364/DIG. 1; 364/DIG. 2; 395/375; 395/800; 395/700; 395/496
[58] Field of Search ................ 395/400, 425, 375, 800

[56] References Cited

U.S. PATENT DOCUMENTS

| | | | |
|---|---|---|---|
| 5,159,680 | 10/1992 | Joy et al. | 395/425 |
| 5,226,142 | 7/1993 | Vegesna et al. | 395/425 |
| 5,233,691 | 8/1993 | Ando et al. | 395/250 |

*Primary Examiner*—Ken S. Kim
*Attorney, Agent, or Firm*—Bo-In Lin

[57] ABSTRACT

The present invention comprises a decoding system for decoding a data accessing instruction for accessing data stored in a plurality of registers wherein the registers are of different types including a global type, a local type, an input type and an output type, the registers being cataloged into a plurality of windows arranged in a predefined window sequence wherein each window including a plurality of registers of each of the types arranged in a predefined register sequence wherein the output registers of one of the windows being overlapping with the input registers of an adjacent window which being next in sequence of the window sequence. The decoding system comprises an instruction issuing means for issuing a data accessing instruction including a plurality of bits wherein the bits being encoded in an order corresponding to the window sequence and the register sequence and a set of bits of the instruction is used for defining a corresponding window and a corresponding type of the registers. The decoding system further comprises a decoding means for decoding each sets of bits of the instruction utilizing the overlapping of input registers with output registers between two adjacent register windows to select a register in one of windows for retrieving the stored data therefrom.

3 Claims, 9 Drawing Sheets

METHOD AND SYSTEM CONFIGURATION FOR SIMPLIFYING THE DECODING SYSTEM FOR ACCESS TO AN REGISTER FILE WITH OVERLAPPING WINDOWS

BACKGROUND OF THE INVENTION

1. Field of the Invention

This invention relates generally to the memory access management for a central process unit (CPU) in a reduced instruction set computer (RISC). More particularly, this invention relates to the apparatus and method for implementing a decoding system in the overlapping windowed register file whereby the decoding process can be expeditiously performed with simply structured logic circuits.

2. Description of the Prior Art

The speed of the data retrieval and the complexity of both the circuit and the associated data retrieval software are two inter-related critical design considerations which if not properly managed may often limit a high performance central process unit (CPU) from achieving high data access rate to the memory. The memory of a computer is often organized in a hierarchical manner wherein the 'top level memory' is the one which is most directly accessible to the central process unit (CPU). Usually, the data which are most frequently used by the CPU are stored in this 'top level memory'.

For the CPU of a reduced instruction set computer (RISC), a structure in the form of register files are often used for the construction of the top level memory because the data can be retrieved at a very high access rate since the register mode instructions for data retrieval are high efficiency data access instructions. FIG. 1 shows the organization of a register file 1 which is partitioned into a plurality of fixed-size, overlapping 'windows', e.g., window A (2) and window B (4), wherein each 'window' provide access to the CPU (not shown) when it is 'visible'. Not all registers are simultaneously accessible to the CPU at any given time. Generally, only one window is accessible, i.e., visible, and that window is denoted as 'current window' (6). The current window 6 is selected by the CPU which makes the selection by generating a window number which is then decoded by a register file decoder 8 to point to the selected window and utilize that window as the current window. The CPU is meanwhile executing a plurality of instructions. A register number 10 is selected by the instructions which again is processed by the decoder 8 to select a register in the current window 6 selected by the CPU.

FIG. 1 shows that some registers belong to two different windows but have different register number in each window. Register $r_0$ in window A is register $r_3$ in window B. Such registers are referred to as overlapping registers. Some registers belong to only one window and they are referred to as 'local' registers 12. Registers $r_1$, $r_2$ and $r_3$ are local registers 12 in window A and registers $r_0$, $r_1$, and $r_2$ are local registers 12 in window B. In addition, the register file structure for a RISC CPU further comprises a plurality of global registers (not shown in FIG. 1, see FIG. 2) which belongs to all windows and can be accessed at any given time by the CPU. The use of an overlapping window architecture in configuring a RSIC register file has many associated benefits that will become clear from the discussion below. More details are disclosed in 'RISC I & II Architecture and Pipeline' in 'Reduced Instruction Set Computer Architecture for VLSI' by Manolis G. H. Katevenis, MIT Press 1985.

Each time the CPU execute a procedure call, the window number is updated. Meanwhile, the local registers in that window are allocated by the compiler in advance for that procedure call so that no other window can access them. The extra activities of savings and restoring these registers are therefore not necessary during execution which simplifies the CPU memory management process thus increases the processing speed of the system. On the other hand, the windows are organized in a stack configuration wherein a 'parent' procedure writes all the calling arguments in to the overlapping registers which will automatically accessible by a 'child' procedure called by the parent procedure. The passing of arguments from the calling procedures to the called procedures are thus streamlined without additional data passing management to keep track of how and when to retrieval data from different memory locations in calling a procedure. The use of the overlapping registers also eliminated the requirement of writing the returning-PC (processing code) to indicate the processing status and the returning values from the child to the parent procedure.

Generally, the registers in the overlapping window architecture are of fixed size which allows a simple and fast AND-OR decoding for converting the selection made by CPU and the instructions to a set of window and register numbers. The special NMOS decoder may be used which is significantly faster than the general OR_AND$_{13}$ INVERTER decoder.

This type of memory management is a 'procedure nesting' scheme. In theory, the depth of this type of procedure nesting can be virtually unbounded, however it is limited by the physical constraints of the CPU. The number of registers and windows in a CPU is typically quite small. The overlapping window register files thus allow only few recent procedure calls to be nested in the top of the nesting stack. Older activation records must be saved in memory. Conceptually, the actual organization of the overlapping window register files is not an infinite stack but rather a circular buffer for the top of the stack only with the data stored in the rest of stack maintained in the memory.

FIG. 2 shows a circular stack buffer comprises register files 20 organized into eight windows, i.e., $w_1, w_2, \ldots w_8$. At any given time, a program can address 32 registers including eight 'ins' registers, eight 'locals' registers, eight 'outs' registers, and eight 'global' registers (as is clearly denoted in FIG. 2). The eight 'global' registers are addressable from any window. The eight 'outs' of one window are also the eight 'ins' of the adjacent window. Although an instruction can address twenty-four windowed registers and eight global registers, excluding these global registers, a single window actually comprises sixteen registers, i.e., eight 'ins' and eight 'locals'. The overlapping nature of the register window can be used to pass information quickly between the overlapping 'ins' and 'outs' in two adjacent windows for a multi-tasking operation which is often encountered under the working environment of UNIX. There is no need to read and write these common data as they are simply shared by allowing access to the common addressable memory locations.

However, just because there are overlapping registers wherein a single overlapping register can have two register numbers in two different windows, the decoding process to convert the selections made by the CPU and the calling procedure to the actual addresses pointing to a specific window and register becomes more complicated. A two level decoding circuit is required to perform the decode process. In a typical conventional decoding system, a current window and a current register in that current window must first be determined. And since there are overlapping registers, an overlapping register decoding circuit must be used to determine the selected register if the register in a selected window is determined to be an overlapping register. The decoding process is therefore more time consuming and also the two level decoding circuit is more expensive to manufacture which also occupies greater area of the precious 'real estate' on an IC chip near the CPU.

More specifically, a conventional addressing scheme as utilized by the current RISC designer can be described as the followings by referring to FIG. 2. Since there are eight windows, a current window is usually represented by a current window pointer (CWP) in the form of CWP(2:0) where CWP may have three bits, i.e., bit zero to bit two, pointing to any one of the eight windows. Similarly, since each window has thirty-two registers, the address of a register is represented by Rs(4:0), where Rs may have five bits, i.e., bit zero to bit four, for pointing to each of the thirty two registers in each window. A total of eight bits are used for pointing to a specific register. In theory, a total of two-hundred and fifty six registers are addressable by this eight bits representation, however, due to the overlapping, these eight-bit is used to address only one hundred and thirty six registers.

The inefficiency of this addressing technique can be appreciated from a simple observation that the conventional addressing scheme has to sequentially process more bits than that may be necessary in the process of identifying a specified window and register selected by the CPU. Valuable resources and the processing time are thus wasted and the system performance is adversely affected due to slow data access rate caused by the inefficiency of this address decoding scheme.

Therefore, a need still exists in the art of RISC system design to improve the decoding algorithm and circuit implementation for the overlapping window register file such that these limitations and inefficiency can be eliminated or reduced.

SUMMARY OF THE PRESENT INVENTION

Therefore, one object of the present invention is to teach an algorithm and the circuit implementations to decode the window and register addresses such that the wastes of precious CPU time and memory space as encountered by the prior art can be eliminated or reduced.

Another object of the present invention is to provide a more efficient window address decoding system taking advantage of the fact that there are overlapping registers among neighboring windows.

Another object of the present invention is to implement the more efficient decoding system in a CPU whereby the area occupied by the decoding circuit is reduced while the speed of processing is increased.

Another object of the present invention is to provide windowed register file management system which is faster, cheaper and simpler to implement and manage with less hardware.

Briefly, in a preferred embodiment, the present invention comprises a decoding system for decoding a data accessing instruction for accessing data stored in a plurality of registers wherein the registers are of different types including a global type, a local type, an input type and an output type, the registers being cataloged into a plurality of windows arranged in a predefined window sequence wherein each window including a plurality of registers of each of the types arranged in a predefined register sequence wherein the output registers of one of the windows being overlapping with the input registers of an adjacent window which being next in sequence of the window sequence. The decoding system comprises an instruction issuing means for issuing a data accessing instruction including a plurality of bits wherein the bits being encoded in an order corresponding to the window sequence and the register sequence and a set of bits of the instruction is used for defining a corresponding window and a corresponding type of the registers. The decoding system further comprises a decoding means for decoding each sets of bits of the instruction utilizing the overlapping of input registers with output registers between two adjacent register windows to select a register in one of windows for retrieving the stored data therefrom.

One advantage of the present invention is that it provides a more efficient window address decoding system taking advantage of the fact that there are overlapping registers among neighboring windows.

Another advantage of the present invention is that a more efficient decoding system is implemented in the CPU whereby the area occupied by the decoding circuit is reduced while the speed of processing is increased.

Another advantage of the present invention is that it provides windowed register file management system which is faster, cheaper and simpler to implement and manage with less hardware.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
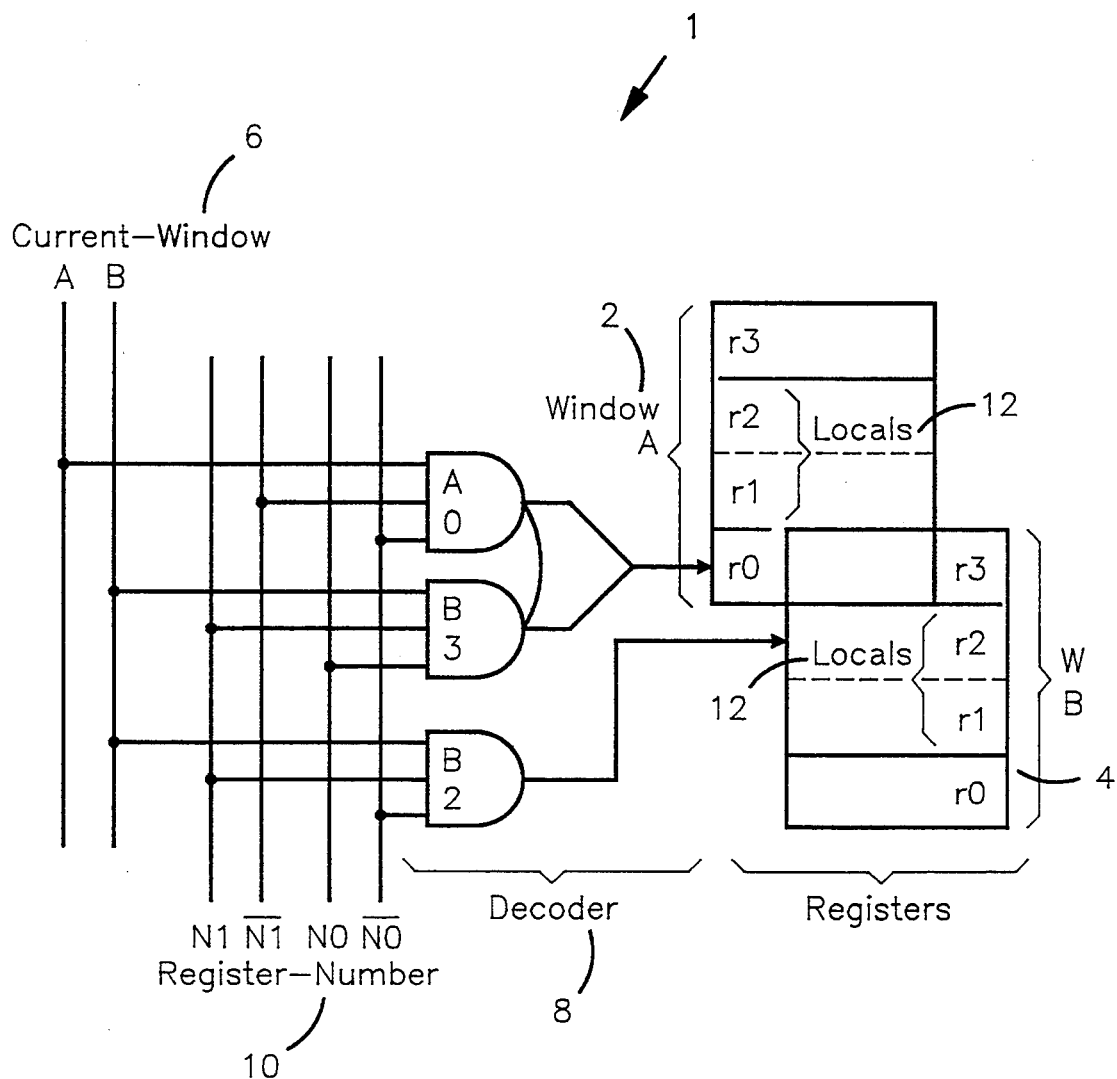
FIG. 1 shows the organization of a plurality of register files into fixed-size overlapping windows.
Figure 2:
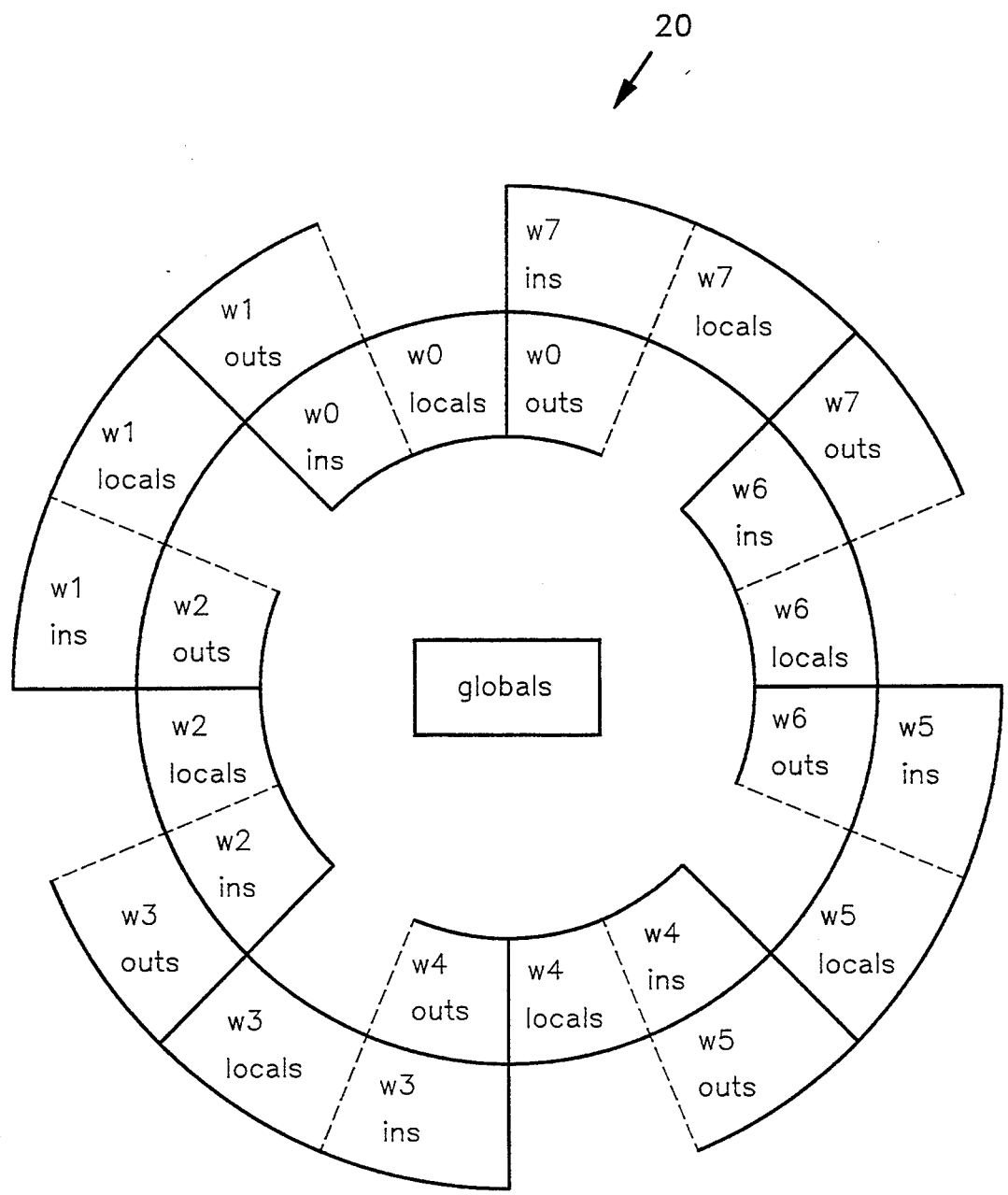
FIG. 2 illustrates a circular stack buffer representing an overlapping window architecture comprising eight register windows.

For the convenience of discussion, an architecture of eight overlapping widows wherein each window has thirty two registers (see FIG. 2) are used to describe the algorithm of the present invention. Each time a procedure call is made by the CPU, the CWP is presumed to increment by one and a conversely, the CWP is decreased by one when a return is made to the calling procedure. Thus, the child procedure is accessing an adjacent window which has a window number incremented by one from that of the window accessed by the parent procedure.

An operation register of five bits is used to address the thirty-two, i.e., $32=2^5$, registers in each window which is divided into four different types, i.e., the 'ins', the 'locals', the 'outs', and the 'global' wherein each type comprises eight registers. Table 1 shows the addressing algorithm used by the present invention for each type of registers.

TABLE 1

| TYPE | REGISTERS | ADDRESS |
|---|---|---|
| ins | 24–31 | 11xxx |
| locals | 16–23 | 10xxx |
| outs | 8–15 | 01xxx |
| globals | 0–7 | 00xxx |

Where xxx represents three bits which can be either zero or one. It should be noted that the first two bits are used to determine the type and the last four bits are used to specify which register the address represents.

Figure 3:
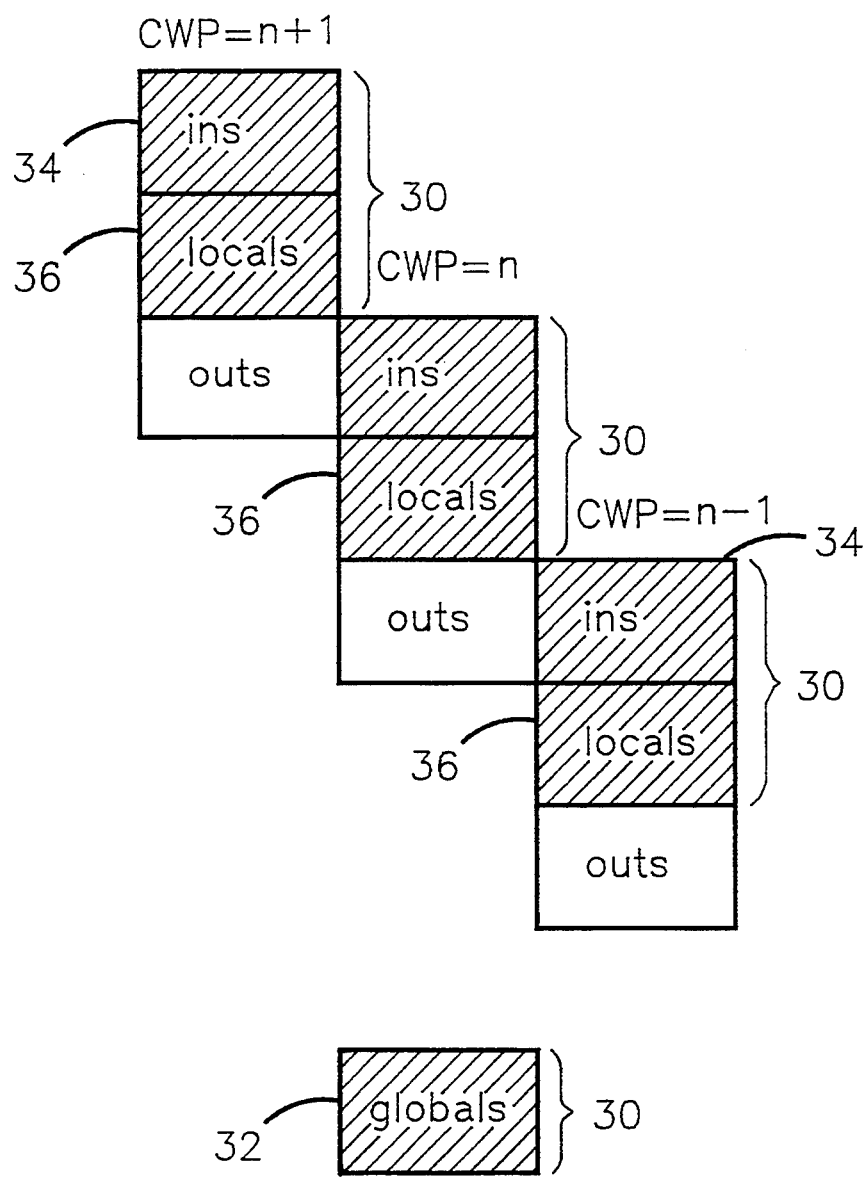
FIG. 3 shows the effective registers in an overlapping window register file architecture.

Since the basic principle of operation in an overlapping window architecture is to overlap the 'ins' and 'outs' of adjacent windows such that the register flush requirement and the input and output operations are eliminated. Other than eight 'globals' which are addressable from every window, each window has sixteen 'effective' registers, i.e., eight 'locals' and eight overlapped registers. FIG. 3 illustrates the concept of the effective registers wherein the effective registers which are visible to the calling procedure and CPU are the shaded areas 30 which include the 'globals' 32, the 'ins' 34 and the 'locals' 36. For that reason, a decoding system according to the present invention only has to address the registers within the 'locals' 36 and the 'ins' 34. Table 1 shows the addressing scheme of such an window overlapping system. For each window, the global registers are assigned with addresses of zero to seven, the local registers with zero to seven and the 'ins' registers from eight to fifteen. For every procedure call which uses the 'outs' registers, the decoder automatically subtract one from the CWP and point to the overlapped registers in the 'ins' register of the adjacent window.

For example if CWP is two and the register address Rs is twelve, based on Table 1, the register is an 'outs' register within the second window. The decoder will automatically reduce that CWP by one and change that register to address Rs=12 to point to an 'ins' register in the first window. Another example, if CWP is one and Rs is twenty eight, by use of Table 1, this register is an 'ins' register in the first window. The CWP is kept the same and the Rs is changed to an memory address twelve. This register happens to be the same register as the same one used by the last example, i.e., CWP=2 and Rs=12.

The process performed by the decoder can be expressed by the following equations:

1. If Rs is equal to or greater than 16 but equal to or less than 31
then:
   a. The CWP is kept the same;
   b. Rm=Rs−16; and
   c. the memory address represents a register which is either an 'ins' or a 'locals' type of register.

2. If Rs is equal to or greater than 8 but equal to or less than 15
then:
   a. CWP=CWP−1;
   b. Rm=Rs; and
   c. the memory address represents a register which is an 'outs' type register.

3. If Rs is equal to or greater than 0 but equal to less than 7
then:
   a. CWP=Global;
   b. Rm=Rs; and
   c. the memory address represents a register which is a 'globals' type.

Figure 4:
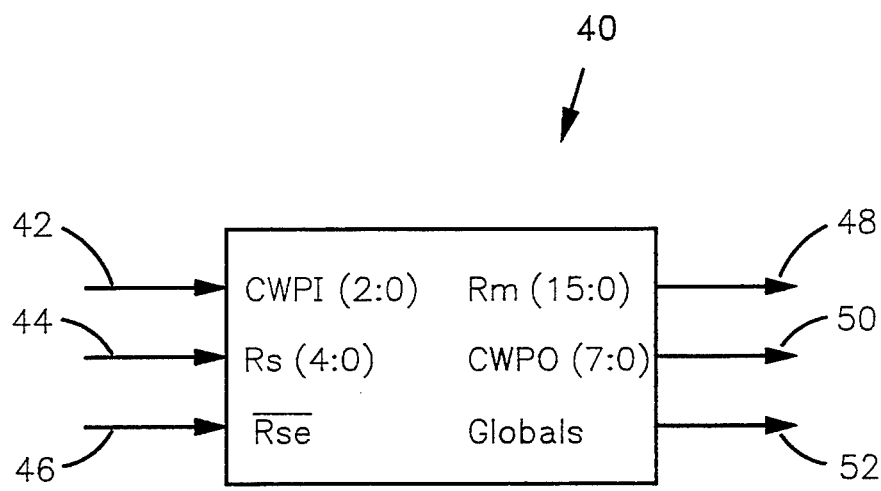
FIG. 4 is an addressing scheme to access the effective registers of FIG. 3.

FIG. 4 shows the input and output pins of an overlapping decoder 40. There are three sets of input pins, namely they are CWPI (42), Rs (44), and Rse-bar (46). The decoder outputs by the use of three sets of pins, i.e., Rm (48), CWPO (50), and globals (52). Table 2 lists the function of each set of pins.

TABLE 2

| Pin Name | Input/Output | Description of Data |
|---|---|---|
| CWPI (2:0) | Input | Current window selection |
| Rs (4:0) | Input | Register address |
| Rse-bar | Input | Switch of the Register File |
| Rm(15:0) | Output | Memory address data |
| CWPO (7:0) | Output | Window |
| GLOBALS | Output | Flag of Globals |

Figure 5:
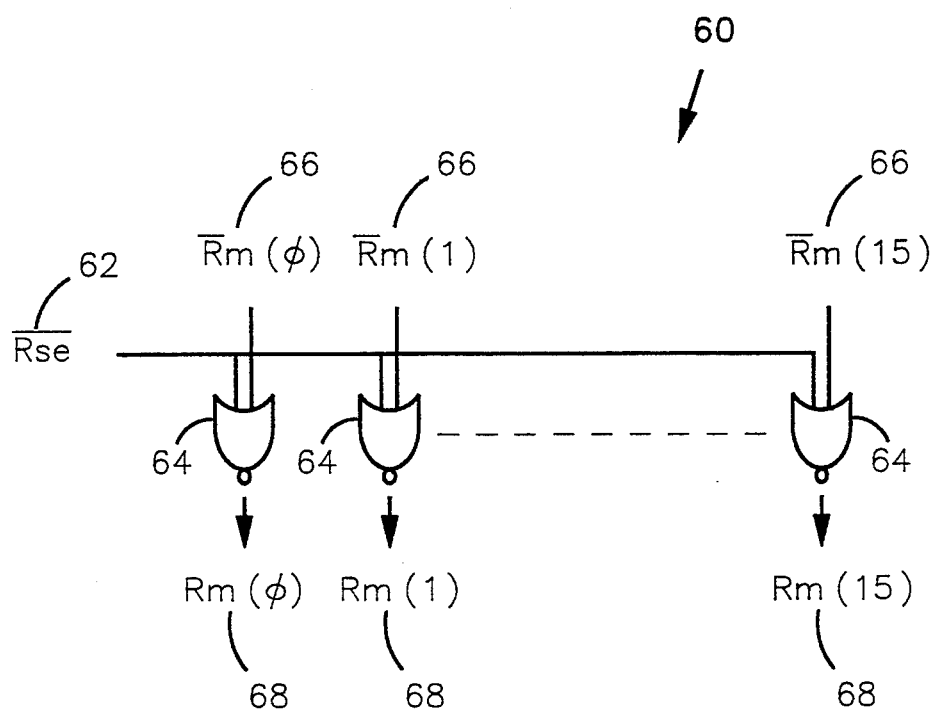
FIG. 5 shows the organization of a plurality of register files into fixed-size overlapping windows.

FIG. 5 shows a switch circuit 60 utilizing the input Rse-bar 62. A series of fifteen exclusive-NOR logic circuits 64 each receiving the input from the Rse-bar 62 pin and one bit from each pin of the inversion of the memory address data pin 66. When the Rse-bar 62 is high, i.e., Rse-bar=1, the register file is turned off because every bit of the memory address, i.e., the values of Rm (0),..., Rm(15) are all zeroed out by the switching logic circuits.

Figure 6:
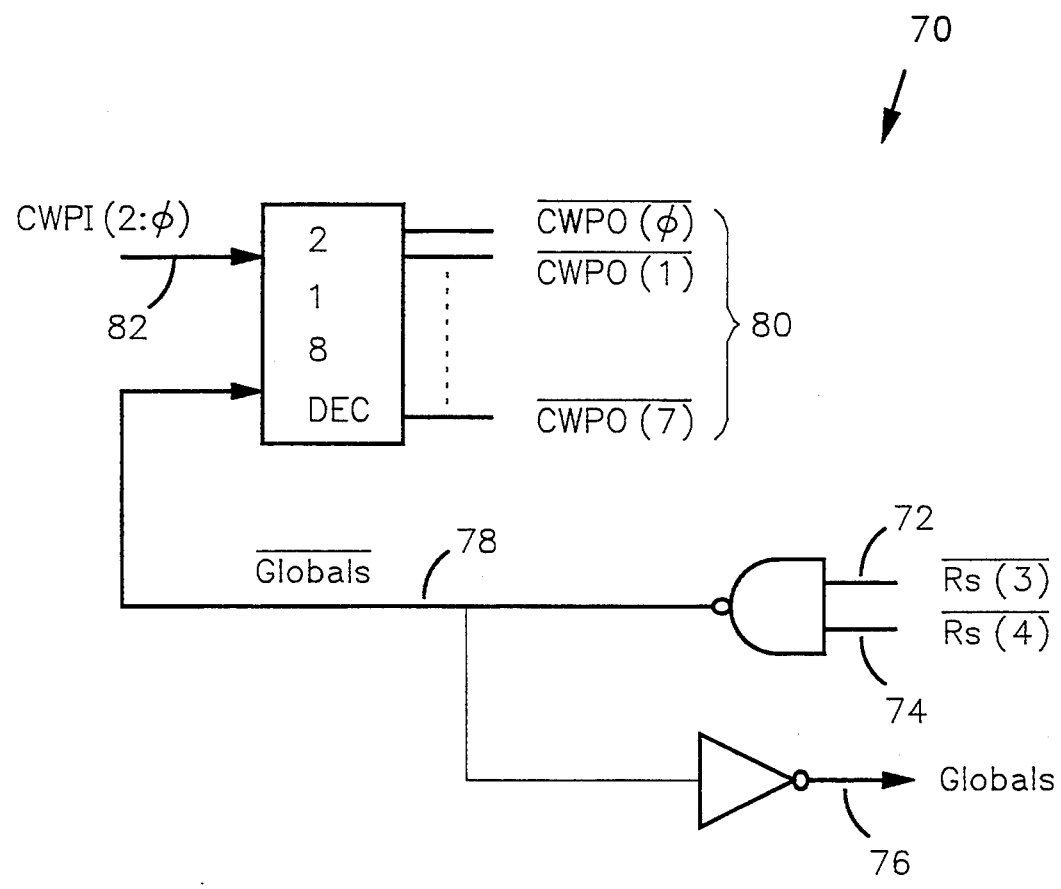
FIG. 6 shows a switching circuit using Rs-bar as an input parameter.

FIG. 6 shows an initial window decoder which utilized the highest two bits of the register address, i.e., Rs (3) (72) and Rs (4) (74) to determine if the register is an 'globals' type. Based on Table 1, when the first two bits are both zeros, the register is a global register which generates a non-zero 'globals' value (76) and further window decoding process is disabled. If the 'globals' is zero (78) then the window decoding process continues which generates non-zero value for one of the pins (80) representing the inversion of CWPO (0) to CWPO (7) depending on the input value of CWPI (2:0) (82).

Figure 7:
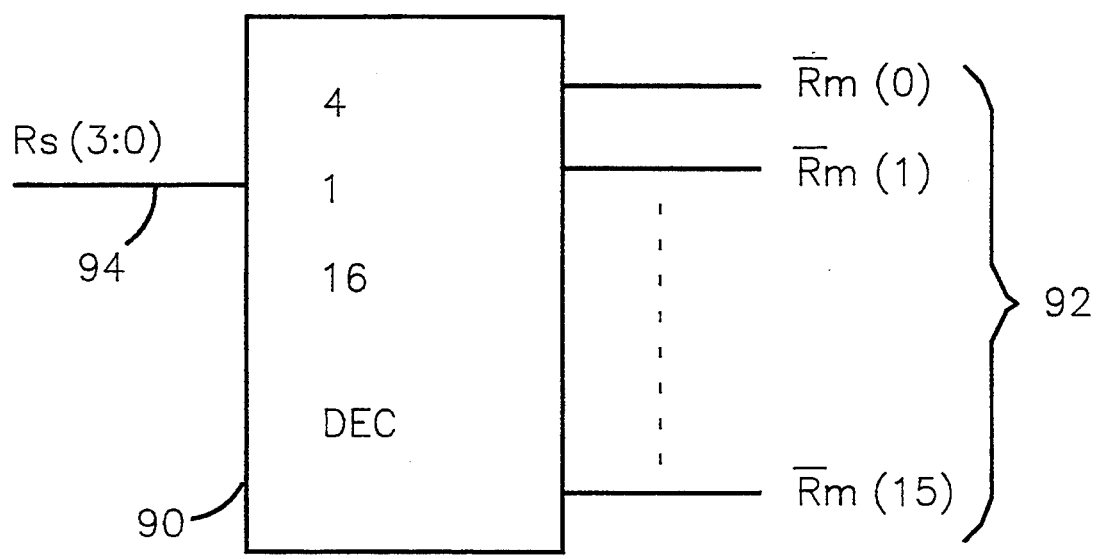
FIG. 7 shows an initial window decoder which utilizes the highest two bits of the register address as input parameters.

FIG. 7 shows a memory address decoder 90 which generates a non-zero output to one of the pins among the inversion of Rm(0) to Rm(15) (92) depending on the value of an four bit input of the register address Rs(3:0)

(94). A register address is thus selected among on one of sixteen possible addresses because for each window only sixteen registers are effective among thirty two registers in each window.

Figure 8:
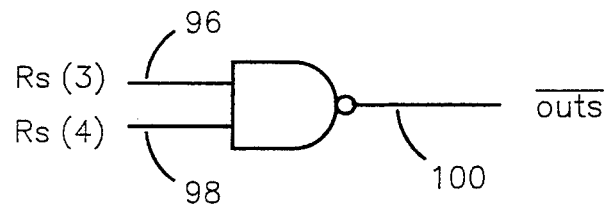
FIG. 8 shows a memory address decoder which generates a non-zero output to one of the pins among the inversion of Rm(0) to Rm(15) depending on the value of an four bit input of the register address Rs(3:0)

After the register address is determined as described above, a determination must also be made for that specific register whether the register is an 'outs' type register. A register is an 'outs' register if Rs is between 8 and 15, i.e., outs=1 only if Rs(3) (96) is a nonzero and Rs(4) (98) is zero. The third and the fourth bits of the register address Rs, i.e., Rs(3) 96 and R(4) 98, are used as inputs in an overlapping decoder as shown in FIG. 8 to determine the value of the inversion of a 'outs' parameter (100).

Figure 9:
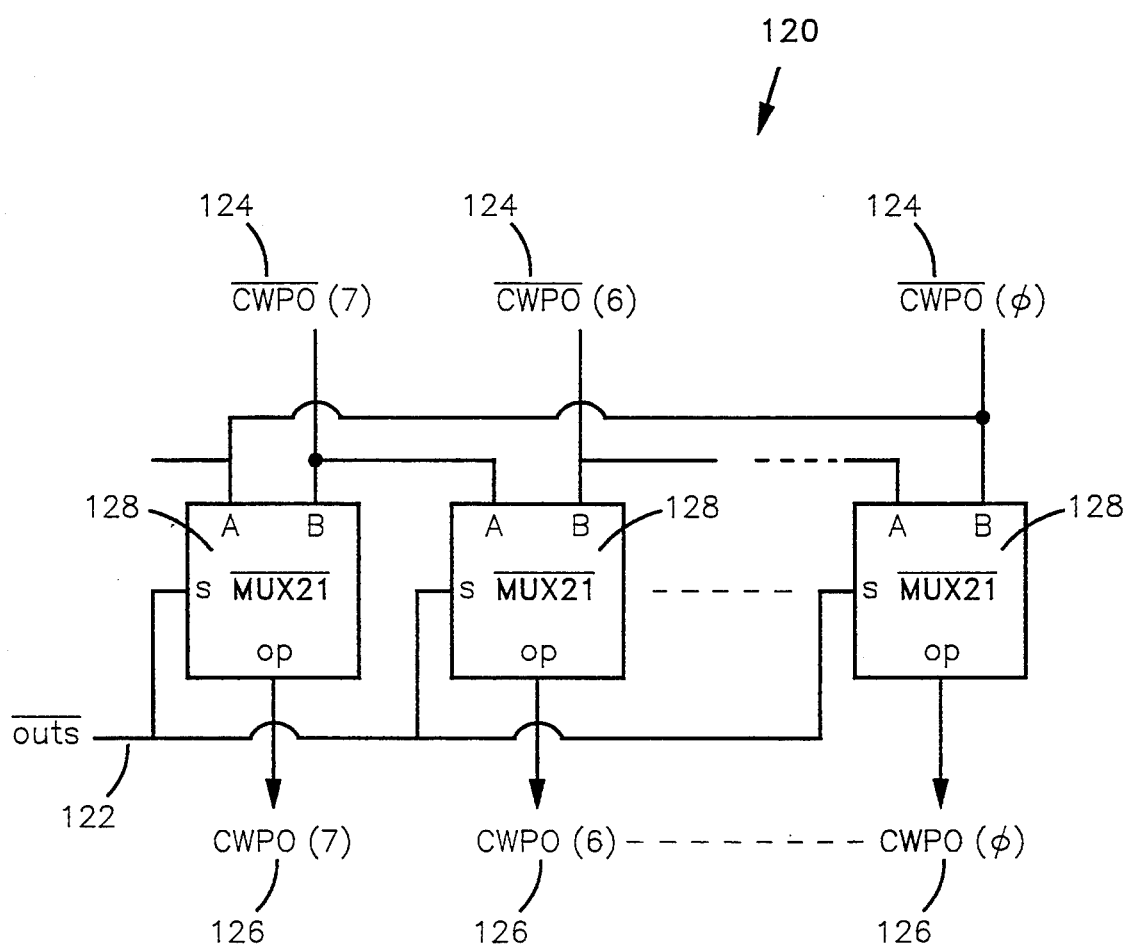
FIG. 9 shows a decoding circuit to decode the window input address utilizing outs-bar as another input parameter.
Figure 10:
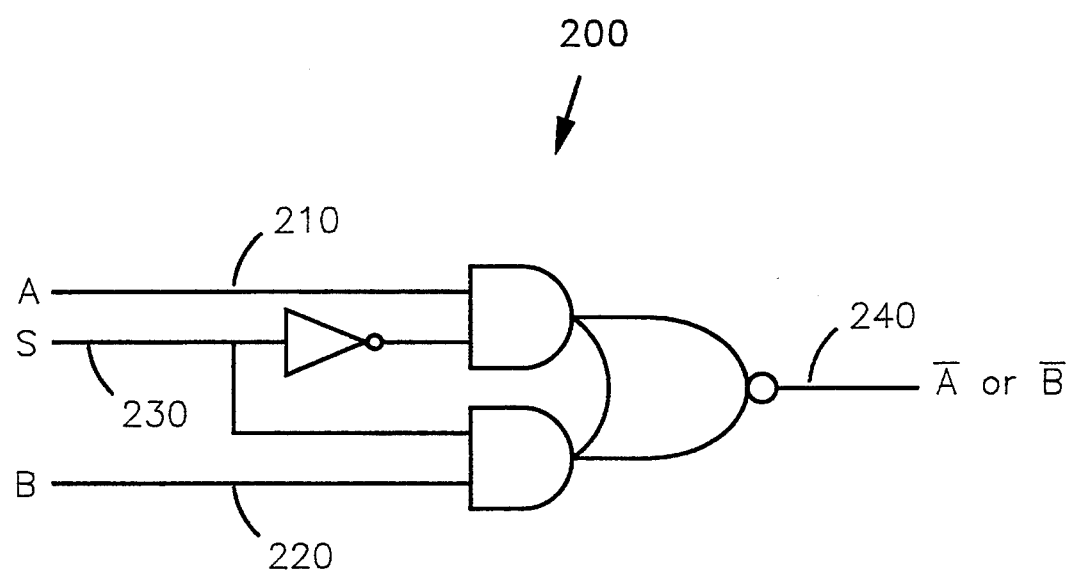
FIG. 10 shows the circuitry configuration of an inverting multiplexer.

Depending on the value of the output from the overlapping decoder, a window number can be determined. If outs-bar is one, i.e., the register is not an 'outs' register, then the decoded window number CWPO is the same as the input window number CWPI, otherwise. CWPO is computed by subtracting one from the input window number CWPI. FIG. 9 shows a final window decoding circuit 120 using the 'outs-bar' 122 and the input window number CWPI 124 as input to obtain the decoded window number CWPO 126. A plurality of inverting multiplexer 128 are used to perform the final window decoding. FIG. 10 depicts an inverting multiplexer 200 which has three inputs, i.e., A (210), B (220), and S (230). The output of the inverting multiplexer 240 is A-bar or B-bar depending on the value of S 230. If S 230 is set to zero then the output 240 is A-bar, otherwise, the output 240 from the inverting multiplexer 200 is B-bar. Through the operation of the final window decoder, the decoded number is one less than the input window number if outs-bar is zero, otherwise, the final window number is maintained the same as the input window number.

The algorithm and the decoding circuit are applicable to various types of overlapping window register files. The advantage of implementing a decoding system of the present invention can be further explained by referring to FIGS. 11 and 12 wherein FIG. 11 illustrates the functional process of a conventional decoder while FIG. 12 illustrates that functional process of the present invention.

Figure 11:
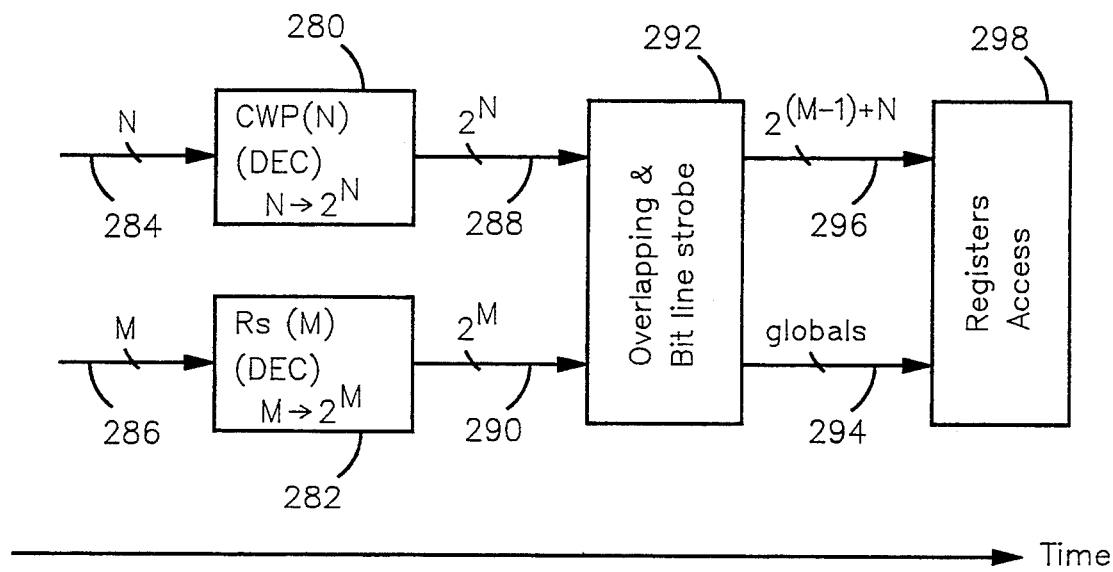
FIG. 11 is a block diagram showing the process flow-diagram performed by a conventional decoder.

The tasks performed by a conventional decoding system as a function of time are shown in FIG. 11. In a conventional decoder, the address of the current window pointer (CWP) is decoded by a window decoder 280 and the address of the working register (Rs) is decoded by a register decoder 282 wherein the window decoder 280 and the register decoder 282 are totally independent of each other. Suppose that the input line 284 to the window decoder 280 is a n-bit input line and the in-out line 286 to the register decoder 282 is a m-bit input line, then the there are $2^n$ output lines 288 from the window decoder 280 and $2^m$ output lines 290 from the register decoder 282. These output lines 288 and 290 are then processed by an overlapping and bit line strobe 292 which generates a global output line 294 and $2^{(m-1+n)}$ output lines 296 to a register access processor 298 to complete the decoding process.

One disadvantage of the conventional decoder is that for each overlapping register among the neighboring widows, a logic circuit of $AND_{13}$ $OR_{13}$ INVERTER (AOI) is required to determine whether a register is an overlapping register or not. For a decoder which has eight windows and each window has eight overlapping registers with the neighboring window, a total of $8 \times 8$, i.e., 64 AOIs logic circuits are required for the decoding process to be performed by the overlapping and bit line strobe 290. The disadvantage of the conventional decoder is caused by the fact that not all the registers among the $2^m$ output lines 290 from the register decoder 282 are truly independent registers because many of them are to be shared through overlapping with their neighboring windows.

Figure 12:
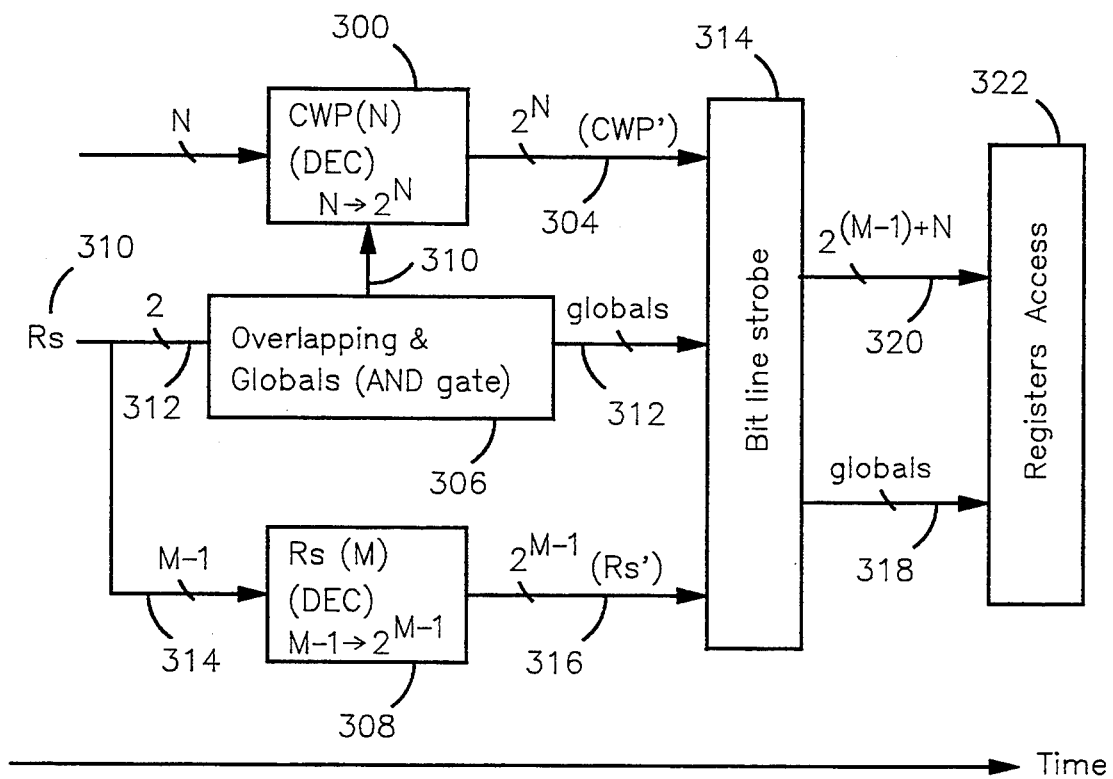
FIG. 12 is a block diagram showing the process flow-diagram performed by the present invention.

FIG. 12 shows the functional process according to the present invention showing the tasks performed by the decoder as a function of time. For the purpose of illustration, the number of registers in each widow for the types of 'ins', 'outs', 'locals', and 'globals' are assumed to be equal. The window decoder 300 receives an encoded window address via a n-bit input line 302 wherein a decoding process is performed to determine the CWP and generate a output to activated one of the $2^n$ output lines 304. The register decoding is now performed by an overlapping and global decoder 306 and an effective register decoder 308 wherein an encoded register address received from an RS-input line 310 is converted into a 2-bit line 312 and a (m−1)-bit line 314 for inputting address data to the overlapping and global decoder 306 and the effective register decoder 308 respectively. From the overlapping and global decoder 306, an overlapping indicator is passed via an inter-decoder line 310 to the window decoder 300 and an global indicator is passed via a global-output line 312 to a bit line strobe 314. The effective register decoder generates an output which activates one of the $2^{(m-1)}$ effective register output lines 316 which again is connected to the bit line strobe 314 for further processing. The bit line strobe 314 activates one of the output lines among a globals-line 318 and $2^{(m+n-1)}$ effective register lines 320 to a register access processor 322 to complete the decoding process.

By separately decoding the global and overlapping registers in the global and overlapping decoder 306, the effective register decoder 308 is required to process a (m−1) to $2^{(m-1)}$ decoding instead of the conventional m to $2^m$ decoding. The area occupied by the logic circuits and the processing time are reduced by a factor of two. Furthermore, the overlapping indicator passed through the output line 310 from the overlapping and global decoder 306 to the window decoder 300 also aids to determination of a selected window under the overlapping condition. Tables 3 and 4 compare the conventional decoding system and the decoding system according to the present invention. The number of devices required by a decoding system of the present invention, especially the number of AOI, is reduced as shown in Table 3. The areas occupied by the logic circuits are reduced and the processing speed is improved as shown in Table 4.

TABLE 3

Comparison of Required Number of Devices

| Conventional Decoder | | Decoder of the Present Invention | |
| --- | --- | --- | --- |
| Device | Number of Devices | Device | Number of Devices |
| 3 to $2_3$ Decoder | 1 | 3 to $2^3$ Decoder | 1 |
| 5 to $2_5$ Decoder | 1 | 4 to $2^4$ Decoder | 1 |
| AOI (AND_OR_IN-VERTER) | 64 | AOI (AND_OR_IN-VERTER) | 8 |
| 5-Input AND Gate | 64 | 2-Input AND Gate | 136 |
| 3-Input AND Gate | 8 | | |

TABLE 3-continued

Comparison of Required Number of Devices

| Conventional Decoder | | Decoder of the Present Invention | |
|---|---|---|---|
| Device | Number of Devices | Device | Number of Devices |
| Inter-connected Data Line | 40 | Inter-connected Data Line | 24 |

TABLE 4

Comparison of Circuit Occupied Areas and Processing Speeds

| | Conventional Decoder | Decoder of the Present Invention |
|---|---|---|
| Circuit Area | 1 | 0.75 |
| Processing Speed | 1 | 0.55 |

The above comparison is made on the basis that the IC devices are made by the use of a 1.2-micron IC technology. The percentages of improvement for both the areas occupied by the logic circuits and the speed of processing as shown in Table 4 would probably be maintained substantially the same when the decoding systems are fabricated by the sub-micron IC technology.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A decoding system for decoding a register access instruction including a window code of N bits for defining a current window and a register code of M bits for defining a current register, for accessing an access register among a plurality of registers wherein said registers including a global type, an input type an output type, and a local type, said registers being cataloged into a plurality of overlapping windows arranged in a predefined window sequence wherein each window including a plurality of registers of each of said types arranged in a predefined register sequence wherein said input registers of one of said windows sharing a common memory location according to an input-output correlation with said output registers of an adjacent window which being one less in sequence of said window sequence, comprising:

an overlapping and global decoding means for decoding first m bits of said register code, where m<M, for determining a register type for identifying if said current register being a global register, a local register, an output, register or an input register;

a window decoding means for decoding said window code of N bits to identify said current window, said window decoding means further employing said access register type from said overlapping and global decoding means for identifying an effective access window wherein:

(i) if said register type being a global register, a local register, or an output register, said effective access window being identified the same as said current window; otherwise, (ii) said effective access window being identified as said adjacent window with one less in said window sequence; and a register decoding means for determining an access register in said effective access window for accessing data stored therein wherein said register decoding means decoding the remaining (M-m) bits of said register code to identify said current register, and wherein:

(i) if said register type being a global register, a local register or an output register, said register decoding means identifying said access register the same as said current register; otherwise, (ii) if said current register is an input register, said register decoding means employing said input-output correlation to identify said access register in said effective access window, which being an adjacent window with one less in said window sequence, whereby duplicate reference to said common memory locations between said overlapping registers in said adjacent windows may be avoided.

2. A method for performing a data access to an access-register by decoding a register access instruction for addressing a plurality of registers wherein said registers being organized into a plurality of sequentially arranged overlapping-windows and said registers in each of said overlapping windows being further organized into several different types including a global type of registers accessible to all of said windows and at least two overlapping types of overlapping registers wherein said overlapping type of registers further including an output type of registers and an input type of registers wherein said output type registers share common memory locations with said input type of registers in said adjacent window of one-prior order according to an overlapping sequence, said method comprising the steps of:

(a) receiving said register access instruction and decoding a first set of bits of said instruction for determining a current window; and decoding a second set of bits of said instruction for determining a current register and determining if said current register is an input type, an output type, or a global type register in said current window;

(b) if said current register is determined to be a global type of register or if said current register is determined to be an output type of register, identifying an effective access window the same as said current window and identifying said current register in said effective access window as said access register for performing a data access thereto; and (c) if said current register is determined to be an input type register, then performing the following steps:

(i) identifying said adjacent window of one-prior-order as the effective access window;

(ii) employing said overlapping sequence between said selected input register in said current window and said overlapping output register in said effective access window to determine an access-register in said effective access window; and (iii) performing a data access to said access register in said effective access window whereby said overlapping sequence is employed for avoiding duplicate reference to said overlapping input type registers and said output type registers between said adjacent overlapping windows.

3. A decoding system for decoding a register access instruction for accessing an access register among a plurality of registers organized in different types including a global type, an input type, an output type, and a local type, said registers being cataloged into a plurality of overlapping windows arranged in a predefined window sequence wherein each window including a plurality of registers of said types arranged in a predefined register sequence with said input registers in one of said windows overlapping according to specific input-output correlation with said output registers in an adjacent window with one prior order in said window sequence, said register access instruction including a window code for defining a current window and a register code for defining a current register, said decoding system comprising:

an overlapping and global decoding means for decoding said register code for determining a register type and an overlapping indicator wherein said overlapping indicator indicating said register is or is not an input register;

a window decoding means which employing said register type and said overlapping indicator determined by said overlapping and global decoding means for decoding said window code to identify a current window and an effective access window wherein:

(i) if said current register is an input register, said window decoding means identifying said effective access window as said adjacent window with one less in said window sequence; otherwise, (ii) said window decoding means identifying said effective access window the same as said current window; and a register decoding means which employing said register type determined by said overlapping and global decoding means for decoding said register code to identify said current register and an access register wherein:

(i) if said register type is an input register, said register decoding means employing said input-output correlation between adjacent overlapping windows to identify said access register in said effective access window corresponding to said current register in said current window; otherwise (ii) said register decoding means identifying said access register the same as said current register;

whereby said access register in said effective access window may be identified and accessed by employing said input-output correction to avoid duplicate reference to said overlapping registers between said adjacent windows.

* * * * *